United States Patent [19]

Nibby et al.

[11] 3,814,921

[45] June 4, 1974

[54] APPARATUS AND METHOD FOR A MEMORY PARTIAL-WRITE OF ERROR CORRECTING ENCODED DATA

[75] Inventors: Chester M. Nibby, Billerica; John C. Manton, Marlboro, both of Mass.

[73] Assignee: Honeywell Information Systems Inc., Waltham, Mass.

[22] Filed: Nov. 15, 1972

[21] Appl. No.: 306,779

[52] U.S. Cl. 235/153 AM, 340/146.1 AL, 340/174 ED

[51] Int. Cl. ........................ G11c 29/00, G06f 11/12

[58] Field of Search.... 235/153 AM; 340/146.1 AL, 340/146.1 F, 174 ED

[56] References Cited

UNITED STATES PATENTS 3,573,728 4/1971 Kolankowsky et al. ... 340/146.1 AL

*Primary Examiner*—Malcolm A. Morrison
*Assistant Examiner*—R. Stephen Dildine, Jr.
*Attorney, Agent, or Firm*—Ronald T. Reiling

[57] ABSTRACT

Apparatus and method for improved "partial-write" operation in a memory module in which data is stored along with error-correcting code check bits. Incoming data replaces a portion of a data group already stored in a specified memory module location in a partial write operation. Apparatus is provided according to the invention, for determining the error-correcting code check bits for the combined data group while simultaneously verifying the accuracy of the previously stored data group. An error in the previously stored data causes apparatus to correct both the combined data group and the error-correcting check bits. The correction, rather than the recalculation, of the error-correcting code check bits permits more effective utilization of the memory module.

7 Claims, 4 Drawing Figures

APPARATUS AND METHOD FOR A MEMORY PARTIAL-WRITE OF ERROR CORRECTING ENCODED DATA

BACKGROUND OF THE INVENTION

1. Field of the Invention

This invention relates generally to data processing units and more particularly to the error-correcting code equipment associated with the data processing unit memory module for the enhancement of the integrity of the data stored in the memory elements. Apparatus performing a "partial-write" operation, an operation for writing into memory a combination of incoming data and data previously stored in the memory, is utilized in a manner to reduce the time interval required for the operation.

2. Description of the Prior Art

In memory modules associated with data processing units, it is frequently desirable to provide methods of enhancing the integrity of stored data. For example, metal-oxide-semiconductor field effect transistor (MOSFET) memory elements, at the present stage of development, are volatile in nature and require a plurality of restorative signals to maintain the stored information. The restorative signals, as well as the volatile nature of the memory, produce additional noise sources for introducing spurious data into the memory element.

To minimize the effect of the spurious data, additional check bit positions are included in memory data groups or data words to establish the occurrence of an error. The most common use of the check bit position displays the parity of a data word subgroup or data byte. However, the parity bit indicates only that an error has occurred, but provides no method for locating the error.

On the other hand it is known in the prior art to use an error-correcting code (ECC) techniques to enhance data integrity. The ECC check bits not only establish the presence of an error, but provide the location of the error for certain classes of errors. (A detailed discussion of error-correcting codes is given in Error-Correcting Codes. W. Wesley Peterson and E. J. Weldon Jr., MIT Press, Cambridge, 1972). The ability to establish the location of errors is achieved at the cost of increased apparatus and at a penalty of increased time intervals necessary for encoding and decoding the ECC check bits.

Simultaneously, it has been desirable to increase the speed at which information can be exchanged between the central processor and the memory. The circuits of the memory module provide the ultimate limitations on the speed of data manipulation in the module, however, by processing a large amount of information in parallel, the speed of the information manipulation per unit time is increased. Thus, it is desirable to provide a large data "word" for use in the memory module.

The large data word increases the situations where it is necessary to correct or replace only a portion of the data word. A "partial-write" operation thus occurs when a portion of a data word stored in memory is altered on the basis of data entering the memory module and the result is stored once again in the memory elements. This operation is complicated, in memory modules containing ECC apparatus, because the portion of the original data word must be checked for accuracy before the new data word, the combination of the incoming data and the original data word, can be provided with new ECC check bits. It is known in the prior art to decode the ECC check bits of the stored data word, correct, if necessary, the data to be retained, combine this data with the incoming data, provide the combined data word with new ECC check bits and finally store the combined data word with the new ECC check bits in the memory elements. This extensive manipulation requires a relatively large time interval during which the memory module is unavailable to the central processor.

It is therefore an object of the present invention to provide improved apparatus and method for an error-correcting code operation in a memory module.

It is another object of the present invention to provide an improved "partial-write" operation in a memory containing ECC apparatus.

It is a more particular object of the present invention to provide apparatus for correcting calculated ECC check bits upon determination of the location of an error in the data from which the ECC check bits were determined.

It is a still further object of the present invention to reduce the time interval necessary for the "partial-write" operation on a memory module containing ECC apparatus.

It is another object of the present invention to provide for increase usage of a memory module containing ECC equipment.

It is still another object of the present invention to provide a shortened period of unavailability of a memory module containing ECC apparatus to a central processor during a "partial-write" operation.

SUMMARY OF THE INVENTION

The aforementioned and other objects are accomplished, according to the present invention, by apparatus for correcting ECC check bits and for altering incorrect data in a data word. In a "partial-write" operation, incoming data is combined with portions of a data word previously stored in a specified memory module location. New ECC check bits are generated from the combined data word, while the ECC check bits associated with the previously stored data word are simultaneously decoded to establish the location of an error, if an error exists. The apparatus for correcting ECC check bits operates on the ECC check bits generated from the combined data, so that the resulting check bits are equivalent to those for an error-free stored data word. Simultaneously, the error in the combined data word is corrected. The corrected ECC check bits and the associated combined data words are stored in the specified location.

These and other features of the invention will be understood upon reading of the following description along with the drawings.

DESCRIPTION OF THE PREFERRED EMBODIMENT

Detailed Description of the Figures

Figures 1, 2:
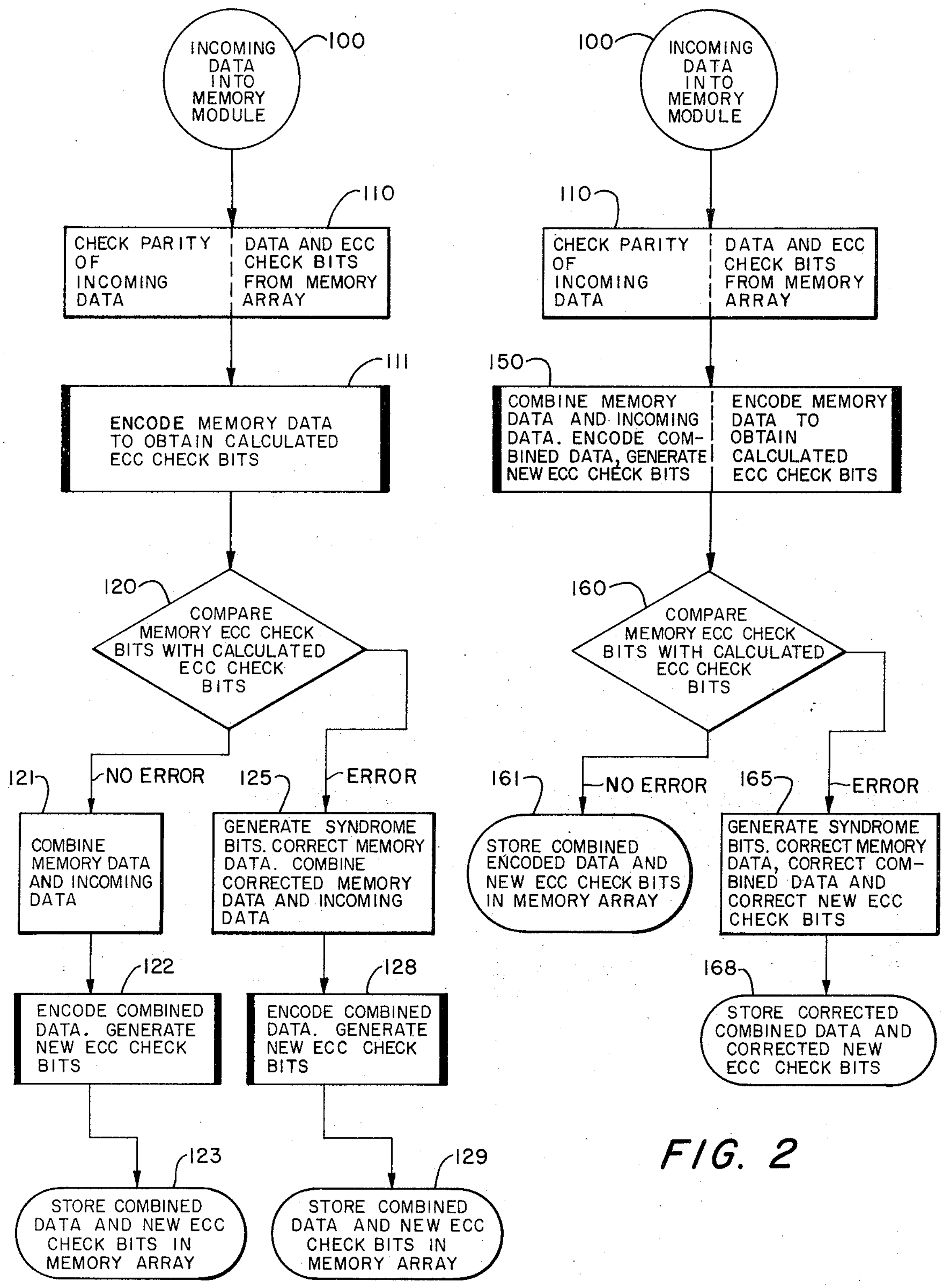
FIG. 1 (PRIOR ART) FIG. 2
FIG. 1 is a flow chart of a "partial-write" operation according to the prior art in a memory module utilizing error-correcting code equipment.
FIG. 2 is a flow chart of a "partial-write" operation according to the present invention in a memory module utilizing error-correcting code equipment.

Referring now to FIG. 1 and FIG. 2 a "partial-write" operation, in a memory module employing ECC techniques, as performed according to the present invention is compared with the operation performed by the prior art.

In FIG. 1, the flow chart of the "partial-write" process performed according to the prior art is displayed. The process begins, in Step 100, when incoming data from a central processing unit is delivered to the memory module. Mask signals, delivered by the central processing unit to the memory module, define data bytes to be replaced by the incoming data in a data word stored in memory array storage elements.

In Step 110, parity bits for each of the data bytes of the incoming data are calculated and the resulting parity bit for each data byte is compared with a parity bit accompanying each data byte in the incoming data. The accuracy of the data transfer is thereby tested and a discrepancy between the corresponding parity bits is signaled to the central processing unit for appropriate action. Simultaneously, a memory data word, including accompanying memory ECC check bits, is extracted from the memory array elements.

In Step 111, test ECC check bits are calculated from the extracted memory data, ignoring temporarily the memory ECC check bits portion of the extracted memory word.

The test ECC check bits and the memory ECC check bits are compared in Step 120. When the test ECC check bits and the memory ECC check bits are identical, no (identifiable) error has been introduced into the memory data word while it was stored in the memory array elements. Consequently in Step 121, the data from the memory data word and the incoming data are combined in a manner established by the mask signals.

The combined data word is used to calculate a new set of ECC check bits in Step 122. Subsequently in Step 123 the combined data word and the new ECC check bits are stored in the memory array elements.

However, if the test ECC check bits and the memory ECC check bits do not agree in Step 120, an error has been introduced into the stored data word.

In Step 125, syndrome bits are generated by a logical comparison of the test ECC check bits with the memory ECC check bits. The syndrome bits establish the location of the error originating in the memory element array. Using the syndrome bits, the error in memory data is located and corrected. Then the corrected memory data word and the incoming data are combined in the manner determined by the mask signals.

In Step 128, the corrected combined data are used to calculate new ECC check bits, and the corrected combined data along with the new ECC check bits are stored in the memory array.

In FIG. 2, a flow chart of the "partial-write" process performed according to the present invention is displayed. Step 100 and Step 110 are substantially identical to the prior art process steps and have been described previously.

In Step 150, the incoming data and the memory data are combined in a manner determined by the central processing unit mask signals. The combined data are used to generate new ECC check bits. Substantially, simultaneously, the memory data is used to calculate the test ECC check bits.

In Step 160, the test ECC check bits are compared with the memory ECC check bits. When the two sets of ECC check bits agree, no (identifiable) error has been introduced in the memory data. In this situation, the combined data including the new ECC check bits are stored in the memory array elements in process Step 161.

If, in Step 160, the test ECC check bits and the memory ECC check bit do not agree, then an error has been generated in the memory data word. Upon determination of the presence of an error, syndrome bits are generated by logically combining the test ECC check bits and the memory ECC check bits in Step 165. The syndrome bits contain the information, in encoded form, providing the specific location of the error. The syndrome bits are decoded, and the memory data is corrected.

The corrected memory data is in turn used to correct the combined data. Similarly, the location of memory data error allows the new ECC check bits to be corrected without the necessity of recomputing the new ECC check bits.

In Step 168, the corrected combined data and the corrected new ECC check bits are stored in the memory element array.

In FIG. 1 and FIG. 2, Steps 111, 150, 122 and 128 are emphasized by the heavy shading of the blocks. This shading emphasizes the relatively time consuming steps involving generation of ECC information. By providing the capability of correcting the combined data and the new ECC check bits, the new ECC check bits can be generated simultaneously with the checking of the memory data.

Figure 3:
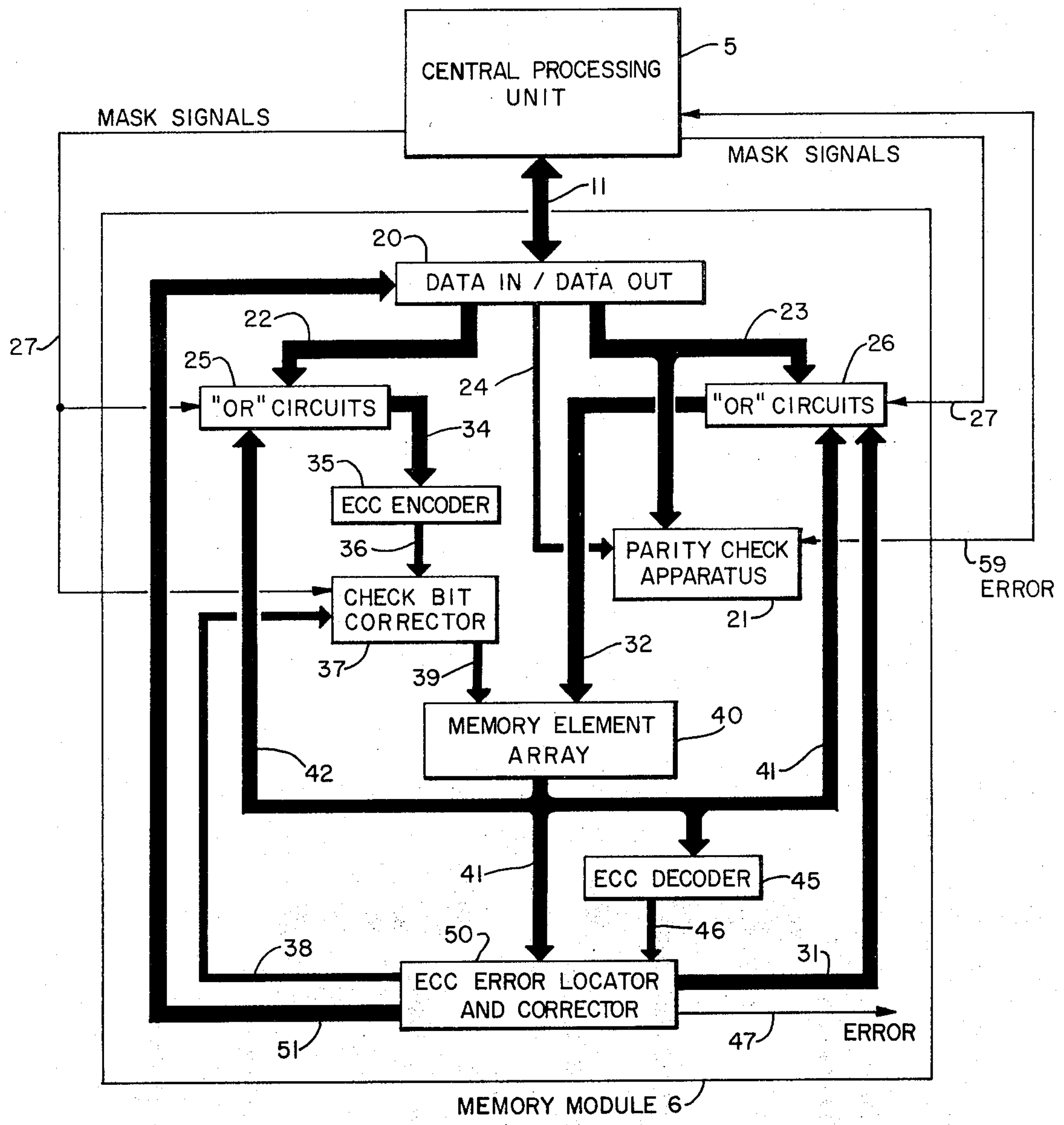
FIG. 3 is a block diagram of the flow of data bits, into and out of the memory element array in the memory module.

Referring next to FIG. 3, a block diagram of the apparatus necessary to perform the "partial-write" operation in a memory module is shown. Data In/Data Out Register 20 of Memory Module 6 is coupled to Central Processing Unit 5 via Main Data Bus 11. Main Data Bus 11 is used for the transfer of data. In the "partial-write" operation, data, bytes to replace selected data bytes of a memory word stored in Memory Element Array 40, are entered in the Data In/Data Out register 20. Mask signals, establishing which bytes of the memory data word are to be replaced by the incoming data bytes, are applied to Bus 27.

Bus 27 is coupled to Logic "OR" Circuits 26, Logic "OR" Circuits 25 and Check Bit Corrector 37. In addition, signals, identifying the address of the memory data word and manipulating the memory data word are delivered to the Memory Module 6 in an manner which is apparent to one skilled in the art.

The byte data on the Data In/Data Out Register 20 are applied to Logic "OR" Circuits 25 via Bus 22, to Logic "OR" Circuits 26 via Bus 23 and to Parity Check apparatus 21. The parity data of the Data In/Data Out Register 20 is applied to Parity Check Apparatus 21 via Bus 24. The Parity Check Apparatus 21 computes the parity of each data byte and compares the result with the parity which accompanied the data byte from the Central Processing Unit 5. If the two parity bits are different, an error is signalled to the CPU 5 via Bus 59.

A memory data word, specified by address signals from the CPU 5 is delivered to Logic "OR" Circuits 25 via Bus 42, to Logic "OR" Circuits 26 via Bus 41, to ECC Error Locator and Corrector 50 via Bus 41 and to ECC Decoder 45 via Bus 41.

The data bytes from the Data In/Data Out Register 20 are combined with the data bytes of the extracted memory word in Logic "OR" Circuits 25 and in Logic "OR" Circuits 26 in a manner determined by the Mask Signals.

The combined data bytes of Logic "OR" Circuits 25 are delivered to ECC Encoder 35 via Bus 36. In the ECC Encoder 35, the new ECC check bits are calculated for the combined data bytes. The new ECC check bits are delivered to Check Bit Corrector 37 via Bus 36.

In ECC Decoder 46, test ECC check bits are calculated from the data bytes of the memory word extracted from the Memory Element Array 40. The test ECC check bits are delivered to ECC Error Locator and Corrector 50. In the ECC Error Locator and Corrector 50, the test ECC check bits are compared with the memory data ECC check bits. If the two sets of ECC check bits are identical, the data bytes in Logic "OR" Circuit 26 and the new ECC check bits in the Check Bit Corrector 37 are stored in the Memory Element Array 40 via Bus 32 and Bus 39 respectively.

If the two sets of ECC check bits are not identical, then an error has been introduced into the memory data word, while stored in the Memory Element Array 40. An error signal is delivered to appropriate circuits via Bus 47 the test ECC check bits are logically combined with memory ECC check bits to form synchrome bits. The syndrome bits contain the location of the error in the memory data. The syndrome bits are decoded in ECC error locator and Corrector 50 to produce the location of the error in the memory data. This error is corrected in Corrector 50 and the corrected data bit is delivered to the combined data in Logic "OR" Circuit 26. In Logic "OR" Circuit 26, the error detected by the ECC Error Locator 50 is corrected.

Simultaneously, the syndrome bits are delivered from ECC Error Locator 50 to the Check Bit Corrector 37. In the Check Bit Corrector 37, the newly computed ECC check bits are corrected based on the location of the error, determined by the syndrome bits. The corrected new ECC check bits and the corrected combined data in Logic "OR" Circuits 26 are stored in the Memory Element Array 40.

Figure 4:
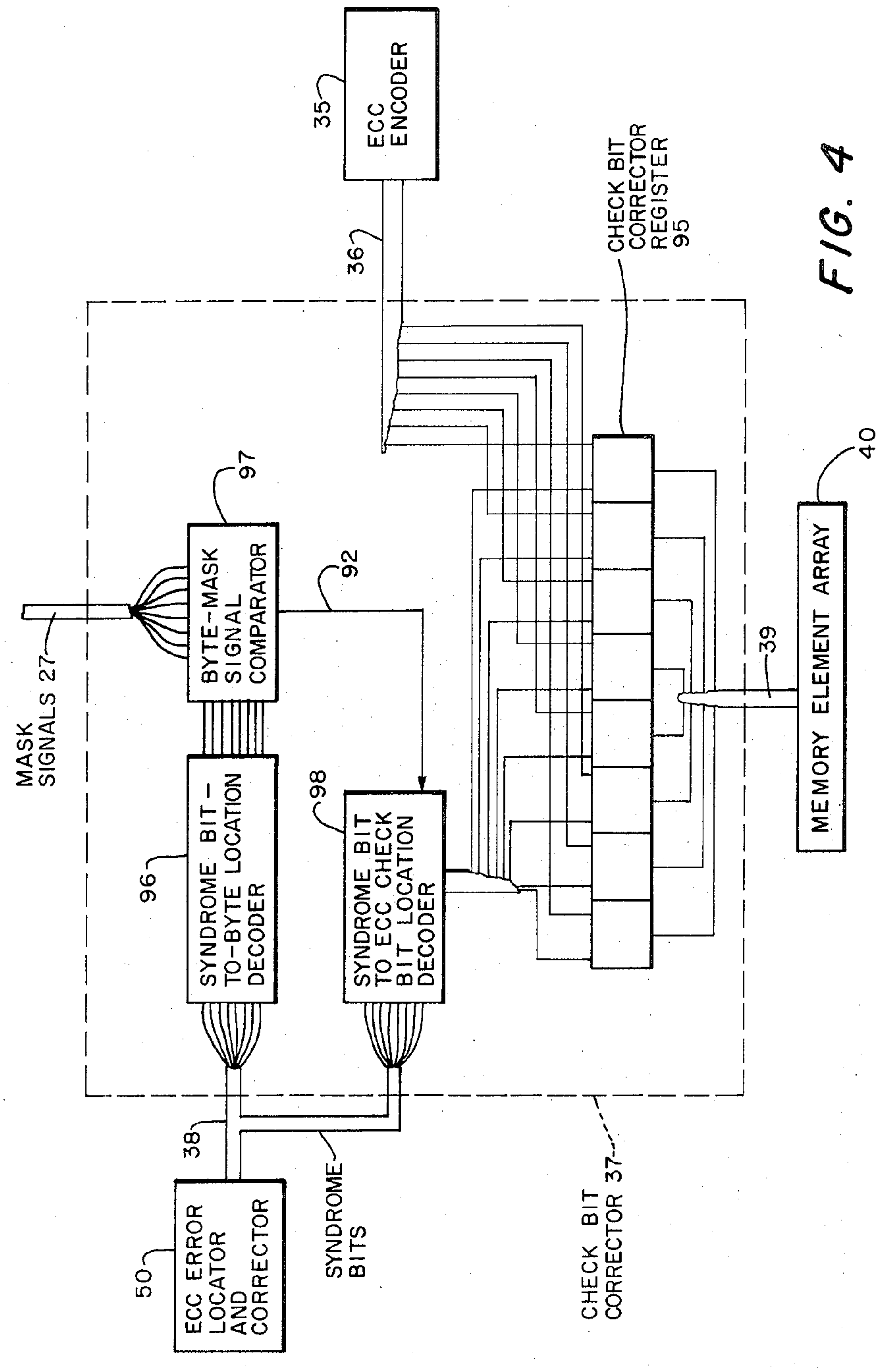
FIG. 4 is a block diagram of the Check Bit Corrector and associated apparatus which permits the parallel processing of information in a "partial-write" operation in a memory module employing error-correcting code equipment.

Referring next to FIG. 4, a block diagram of Check Bit Corrector 37 and the associated apparatus are shown. The new ECC check bits, computed in ECC Encoder 35 from the combined incoming data bytes and the memory data bytes are delivered to Check Bit Corrector Register 95 of Check Bit Corrector 37 via Bus 36. The new ECC check bits are held in the cells of Corrector Register 95 until a signal causes the ECC check bits to be delivered to Memory Element Array 40 via Bus 39 for storage in memory elements.

ECC Error Locator and Corrector 50 delivers the syndrome bits 38 to Syndrome Bit to Byte Location Decoder 96 and to Syndrome Bit to ECC Check Bit Location Decoder 98 via Bus 38. In the Syndrome Bit to Byte Location Decoder 96, the syndrome bits are decoded, by standard logic apparatus, to determine the specific memory data byte in which the error has been introduced. The identity of the erroneous memory data byte is delivered to Byte-Mask Signal Comparator 97. In Byte-Mask Signal Comparator 97, a comparison is made to determine whether the erroneous memory data byte is one of the data bytes which will be retained in the "partial-write" operation. If the error is found in a byte which is not to be retained, then the contents of Check Bit Corrector Register 95 are correct, and upon an appropriate signal these contents can be delivered to the Memory Element Array 40 unchanged.

If however the Byte-Mask Signal Comparator 97 establishes that the error-containing memory byte is to be returned to Memory Array 40 in the "partial-write" operation, then the contents of Check Bit Corrector Register 95 must be changed. To effect this change in Register 95, a change signal is delivered to Syndrome Bit to ECC Check Bit Location Decoder 98 via Bus 92. In Location Decoder 98, the syndrome bits are decoded, by standard logical apparatus in a manner to identify the specific ECC check bits which include the data bit location in which the error has been identified. The specific ECC check bits are incorrect in the Register 95. The identity of the specific ECC check bits affected by the error plus the enabling change signal (of bus 92) permits the appropriate ECC check bit in Register 95 to be corrected prior to the storing in Memory Array 40 of the contents of Register 95.

The specific implementations of the Decoder 96 and Decoder 98 depend on the specific ECC technique employed, but will be apparent to one skilled in the art, once the particular ECC encoding technique has been chosen. It also is possible to include part or all of the decoding functions of Decoder 96 and Decoder 98 in the ECC Error Locator and Corrector without departing from the present invention.

OPERATION OF THE PREFERRED EMBODIMENT

In the preferred embodiment, a data word consists of 8 bytes of 8 bits each, plus 1 parity bit for each of the 8 bytes, when not stored in the memory array. When stored in the memory array the 8 parity locations contain 8 ECC check bits. However, the lengths and other combination of the information bits and check bits may be used without departing from the scope of the invention.

A data group, not necessarily a complete word, of bytes plus parity bits is introduced into a memory module from the central processor, in preparation for a "partial-write" operation. In the partial write, a complete word, stored in the memory array is extracted from a location determined by address signals from the central processor, and selected bytes of the stored data are replaced by bytes of incoming data. The selected bytes are determined by mask signals which "mask" the bytes of the stored data word to be replaced and allow the bytes of incoming data to replace the selected bytes.

The parity bits of the incoming data bytes are first checked to insure the integrity of information. Next the stored word is extracted from the memory array. With the extraction of the stored word, two processes take place essentially simultaneously. First the data bytes of the stored word and the bytes of the incoming data are combined in a manner determined by the mask signals. The ECC check bits are determined from the data bytes of the new combined data word by an algorithm appropriate to the ECC technique employed. Simultaneously, the data bits of the stored word are compared with the accompanying ECC check bits to determine if an error has been introduced into the stored word in the memory array. When an error has been introduced in the stored word, the error in the stored word and consequently the new data word is corrected, if the error has been located in an unmasked byte. Similarly, an error in the data bytes of the stored word, when the error is located in an unmasked byte, indicates that the ECC check bits are incorrect.

However, the ECC check bits may be corrected by changing the logical state of the particular ECC check bits which monitor the location in which the error occurred.

The correction of the ECC check bits, rather than the recalculation of the ECC check bits, provides a decrease in time required for the "partial-write" operation. The decrease in computation time results from the parallel calculation of the new data word ECC check bits and the location and correction of errors in the data bytes of the stored word.

After the ECC check bits and the data bytes of the new data word are established to be error-free or else any error has been corrected, the new data word is stored in the memory array, thereby completing the "partial-write" operation.

Normal "read" and "write" operations involving ECC code apparatus are handled in manner of the prior art. In the preferred embodiment, apparatus is included for by-passing the ECC apparatus and storing the data bytes plus parity rather than the data bytes plus ECC check bits.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. In combination with a data processing unit, a memory module comprising:

memory element means for storing groups of signals;

register means coupled to said memory element means and to said data processing unit for temporarily storing a combination group of data signals, said combination group of signals consisting of data signals from said data processing unit and data signals from said memory element means;

encoder means coupled to said register means and to said memory element means for generating a group of error-correcting code (ECC) signals derived from said combination group of data signals, said group of code signals associated with said combination group of data signals;

decoder means for locating an error in said group of data signals withdrawn from said memory element means, said error location determined by said group of memory data signals and said group of code signals associated with said group of memory data signals;

first correction means coupled to said register means for correcting an error in said combination group of data signals based on said error location of said decoder means;

second correction means coupled to said encoder means for correcting said group of code signals, said group of code signals derived from said combination group of data signals containing a signal at said error location, said corrected group of code signals associated with said corrected group of data signals, said corrected group of data signals and said associated corrected group of code signals stored in said memory element means; and apparatus, coupled to said register means, for bypassing said encoder and said decoder means, an error in a group of data signals being established by accompanying parity signals.

2. The memory module of claim 1 wherein said encoder means generates said group of code signals substantially simultaneously with said locating of an error by said decoding means.

3. In combination with a data processing unit, an improved memory module, said memory module having memory element means and error-correcting code (ECC) apparatus, wherein said ECC signals are provided with data signal groups for location of errors in said data signal groups, wherein the improvement comprises:

first correction means for correcting a data signal group to be stored in said memory element means, said data signal group including an erroneous signal from said memory element means;

second correction means for correcting ECC signals based on said data signal group including an erroneous signal from said memory element means; and decoder means for locating said erroneous signal from said memory element means, said locating of said erroneous signal occurring substantially simultaneously with generation of ECC signals for said data signal group.

4. A method of performing a "partial-write" operation in a memory module containing error-correcting code (ECC) apparatus, wherein said partial-write operation consists of replacement of a portion of a group of data signals in said memory module with new data signals from an associated data processing unit comprising the steps of:

a. entering said new data signals into said memory module from said data processing unit;
b. combining said new data signals and a group of data signals extracted from a memory element array to from a new group of data signals;
c. generating new ECC signals for said new group of data signals;
d. locating an error in said group of extracted data signals by means of ECC signals associated with said group of extracted data signals, said step being performed substantially simultaneously with step c.;
e. correcting said new group of data signals and said new ECC signals based on said error location; and f. storing said corrected new ECC signals and said corrected group of data signals in said memory element array.

5. In a memory module associated with a data processing unit, said memory module having memory element means for storage of data signals and error-correcting code (ECC) means, said ECC means including ECC encoder means for generating ECC signals for a group of data signals, said group of data signals and said ECC signals stored in said memory module, said ECC means also including ECC decoder means for producing ECC syndrome bit signals for a one of said group of data signals and associated ECC signals extracted from said memory, said ECC syndrome bits locating an error in said group of data signals, said ECC means also including an ECC signal corrector apparatus comprising:

register means for receiving a group of ECC signals from said ECC encoder means, said register means holding temporarily said group of ECC check bits, said register means coupled to said memory element means for storing of said group of ECC check bits; and syndrome decoder means coupled to said ECC decoder means and said register means for receiving a group of syndrome signals, said syndrome decoder means providing correction signals to said register means for correcting errors in said group of ECC signals, said register means delivering said corrected group of ECC signals for storing in said memory element means.

6. In a memory module associated with a data processing unit, said memory module having memory element means for storage of data signals and error-correcting code (ECC) means, said ECC means including ECC encoder means for generating ECC signals for a group of data signals, said group of data signals and said ECC signals stored in said memory module, said ECC means also including ECC decoder means for producing ECC syndrome bit signals for a one of said group of data signals and associated ECC signals extracted from said memory, said ECC syndrome bits locating an error in said group of data signals, said ECC means also including an ECC signal corrector apparatus comprising:

register means for receiving a group of ECC signals from said ECC encoder means, said register means holding temporarily said group of ECC check bits, said register means coupled to said memory element means for storing of said group of ECC check bits; and syndrome decoder means coupled to said ECC decoder means and said register means for receiving a group of syndrome signals, said syndrome decoder means providing correction signals to said register means for correcting errors in said group of ECC signals, said register means delivering said corrected group of ECC signals for storing in said memory element means, wherein said syndrome decoder means includes a first decoder means and a second decoder means, said first decoder means for comparing locations determined by syndrome signals with a location determined by data replacement signals from said data processing unit wherein a coincidence of said syndrome signals location and said data replacement location causes said first decoder means to apply a control signal to said second decoder means, said second decoder means for determining which of said ECC signals contain an error, said second decoder means generating said correction signals applied to said register means, said correction signals applied to said register means after receipt of said control signal from said first decoder means.

7. In a memory module associated with a data processing unit, an improved method of performing a "partial-write" operation, said "partial-write" operation being a replacement of a portion of a group of data signals stored in said memory module by data signals from said data processing unit, said memory module including error-correction code ECC apparatus for location of an error generated in said stored group of data signals, wherein the improvement comprises:

determining an error location in said group of memory data signals while substantially simultaneously generating ECC signals for a combination signal group including said group of memory data and said group of data processing unit data signals; and correcting said generated ECC signals and said combination signal group, said error location establishing which of said ECC signals and which signal of said combination group of signals are to be corrected.

* * * * *